July 28, 1959 F. BIEDERMANN 2,896,508
DIAPHRAGM SUITABLE FOR PHOTOMETERS
Filed April 23, 1954
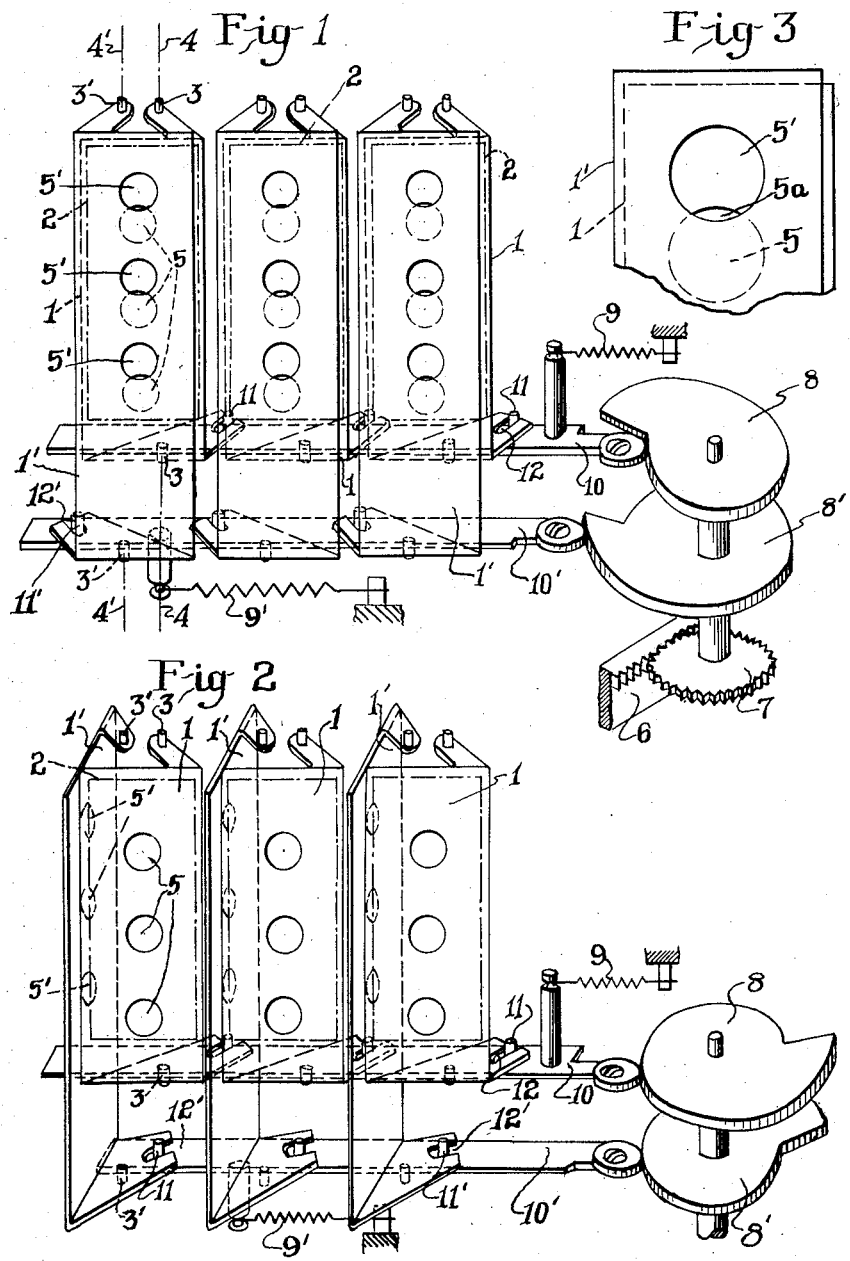
INVENTOR
Friedrich Biedermann
BY Connolly and Hutz
HIS ATTORNEYS

United States Patent Office 2,896,508
Patented July 28, 1959

2,896,508

DIAPHRAGM SUITABLE FOR PHOTOMETERS

Friedrich Biedermann, Munich-Unterhaching, Germany, assignor to AGFA Aktiengesellschaft Application April 23, 1954, Serial No. 425,297

Claims priority, application Germany May 21, 1953

10 Claims. (Cl. 88—61)

This invention relates to a diaphragm suitable for photometers, especially for photo-electric exposure meters. Photo-electric exposure meters, more especially exposure meters which are built into cameras, are frequently so constructed that the needle of the galvanometer is required to be adjusted on to a fixed index either by electrical resistance connections or by regulating the light beam incident upon the photo-electric element. These methods have the advantage, if the exposure meter is coupled with the camera, that the adjustment of the needle to the fixed index can be effected by the setting means of the camera.

The setting of the needle at the fixed index by adjusting the light beam incident upon the photo-electric element has the advantage, as compared with the setting of the needle by influencing the photo-electric current by means of electrical resistance connections, that the exposure measurements always take place with a constant light beam incident upon the photometer surface, and that, therefore, the measurement is independent of the characteristic of the photo-element.

The control of the light beam incident upon the photo-element is affected in known manner by adjustable diaphragms which are mounted in front of the photo-element and are mainly constructed in the form of iris diaphragms or pivoted diaphragms. It is also known to use grid diaphragms and screen diaphragms, the elements of which are arranged on two surfaces which are disposed behind and parallel to one another and are displaceable or rotatable relatively to one another, but independently of one another.

A good exposure meter for photographic exposures should permit of measurements in the largest possible brightness range in accordance with the possibilities of adjustment which are given by the choice of the objective diaphragm aperture, the shutter speed and the film sensitivity. If the ratio of 1:4000 is taken as the basis for the lowest and highest measurable brightness values, then with exposure meters of the type hereinbefore mentioned, the light beam incident upon the photometer surface must be continuously adjustable by the diaphragm positioned in front of the cell in this intensity range of 1:4000. In using diaphragms such as have been described above, the control of the light beam within such a wide range in dependence of a single control means—as desired—necessitates a high degree of mechanical precision in the manufacture of the movable parts of the diaphragm and the control members thereof.

In contrast thereto, a diaphragm according to the present invention renders possible the continuous adjustment of the light beam incident upon the photometer surface by simple means within the wide range between the maximum value capable of penetrating the diaphragm and the required smallest fraction of this maximum value which will still cause the photometer to respond. It consists of two movable plates or blades which are disposed one behind the other in the path of the light rays and which are so coupled with one another that their movements in the opening and closing of the diaphragm at least in part are imperatively consecutive. By this means, the light beams passing through the diaphragm are reduced to a greater or lesser and preferably an adjustable fraction by that diaphragm plate which is first brought into the diaphragm plane on closing the diaphragm. This reduced fraction of the light beam is then itself partly or wholly screened off by the following second plate. As will be more fully described with reference to an embodiment shown in the accompanying drawing, it is possible by this means to obtain a substantially higher accuracy in the control of the light beam than was possible with the previously known systems. Conversely, if the demands on the accuracy of the adjustment are not too high, it is possible substantially to reduce the precision requirements in the manufacture of the diaphragm parts and thus also the cost of manufacture.

The diaphragm plates may be so fashioned that the plate which is the first to be brought into the diaphragm plane on closing the diaphragm does not obscure a certain fraction of the diaphragm aperture and that this fraction of the diaphragm aperture is partly or wholly obscured by the following second plate. By making the two plates of light-permeable material of a selected degree of permeability both may be of dimensions corresponding to the entire area of the diaphragm aperture.

According to the invention, two plates which overlap or overlie one another when the diaphragm is closed, are pivotally mounted upon two preferably opposite sides of the diaphragm aperture and can be pivoted out of said aperture through 90° about axes being directed parallel to the plane of said aperture. It is more particularly provided that with the opening and closing of the diaphragm, the movement of one of the plates is only initiated when the movement of the other plate is already completed. The plate which is first pivoted inwardly during the closing movement, or even both plates, may be smaller in area than the diaphragm aperture, or may have the outside dimensions thereof but be provided with light-permeable openings in their surfaces.

Such openings are preferably adjustable in size and may be fitted with coverings of light-diffusing material for more uniform illuminations of the photometer surface. The diaphragm plate openings also serve to render possible the flattening of the control curves which tend to become very steep when the diaphragm plates are at only small opening angles. Instead of using two diaphragm plates, it is also possible to use several plates which are operated in timed succession in the opening and closing operations.

Furthermore, it is also possible according to the invention for several pairs of diaphragm plates to be arranged in juxta-position and for the corresponding plates of each pair to be jointly operated. It is possible in this manner to maintain small the depth of the space in the camera occupied by the whole diaphragm mounting. The control is effected by means of two cam discs in operative connection with two spring-loaded plate slide members, each having driving pins which engage in guide slots in the corresponding plates.

The invention is illustrated in the accompanying drawing, in which:

Fig. 1 shows a compound diaphragm composed of a plurality of individual diaphragms which are formed with openings and each of which consists of two pivoted plates, the compound diaphragm being shown in the closed position, Fig. 2 shows the same diaphragm in the semi-open position, and Fig. 3 is a fragmentary view of two diaphragm plates shown in Fig. 1.

Referring to the drawing, a diaphragm shown consists of three individual diaphragms which are similar to one another and which are jointly controlled. Each of the three individual diaphragms has two rectangular plates 1 and 1', which are each of a size to cover completely the diaphragm aperture 2, which is shown in chain-dotted lines in the drawing. By means of journal pivots 3, 3', they are pivotable about an axis 4 or 4' and, when the diaphragm is closed, they are disposed in a position in which they are overlapped and parallel to one another and both are swung outwardly through 90° when the diaphragm is fully open. The two plates 1 and 1' have formed in their surfaces two series of openings 5 and 5'.

The opening operation of the diaphragm proceeds in such manner that first the plates 1' are pivoted outwardly while the plates 1 remain in the position assumed when the diaphragm is closed. It is only when the plates 1' are disposed at a right-angle to the plane of the diaphragm aperture 2 (see Fig. 2) that the turning movement of the plates 1 starts and proceeds until they are also swung outwardly at right-angles to the diaphragm plane. The closing process takes place in the reverse sequence. The movement to be imparted to the plates is transmitted through a rack 6 and a pinion 7 to two cam discs 8 and 8' which are in operative connection with plate slide members 10 and 10' which are spring loaded by springs 9 and 9'. The slide members control the plates 1 and 1' by means of driving pins 11 and 11' and guide slots 12 and 12'.

In the embodiment above described, the ratio of the sum of the areas of the openings 5 to the area of the diaphragm aperture 2 is 1:64 (1/64 of the maximum light beam corresponds to the sixth diaphragm stage, when the light beam passing through the diaphragm is reduced from stage to stage by a half as the light-obscuring effect increases). Therefore, when the plate 1 is completely pivoted into the diaphragm aperture, but the plate 1' is still open at right angles, the intensity of the light passing through the diaphragm is 1/64 of the intensity of the light falling on the diaphragm in the area of aperture 2.

Furthermore, the size, shape and arrangement of the openings 5' of plate 1' are selected to allow only 1/64 of an incident light beam to strike the openings 5 in plate 1 when plates 1 and 1' are completely closed and overlie each other. Plates 1 and 1' are in most respects similarly formed. The openings 5 and 5' are shown greatly enlarged on the drawing in order to illustrate them more clearly. These openings 5 and 5' are actually, however, quite small in comparison to the distance between plates 1 and 1' when they overlie each other to close the diaphragm. This is especially true when more than three of such openings are provided at each of the plates, these openings being uniformly distributed over the plates. In this distribution the light dispersing openings 5' of plate 1' serve as light sources which illuminate plate 1. Openings 5 and 5' can also be arranged, for example as shown in Fig. 3, to overlie each other only throughout a small area 5a. This provides a less uniform illumination of plate 1 through openings 5' in plate 1'.

The light dispersing effect of the openings 5' can be increased by covering them with light dispersing material. This light dispersing material may be opal glass panes, for example. Openings 5 of plate 1 may also be covered with light dispersing material to illuminate a photoelement arranged behind the diaphragm as uniformly as possible.

With closing of the diaphragm plate 1', the light beam already reduced to 1/64 in the half-closed position of the diaphragm (plate 1 closed, plate 1' open) is again reduced by the factor 64, that is, in relation to the full light beam falling on the diaphragm, by the factor $64^2$, i.e. 4096.

The above described diaphragm is, therefore, suitable for controlling a photometer range of more than 1:4000, each of the two diaphragm plates 1, 1' only having to control a comparatively small range of 1:64. In the use of only one diaphragm plate, however, this plate had to regulate the light beam over the entire range. A diaphragm constructed according to the invention, therefore, has only to be made with 1/64 of the precision of an ordinary single plate diaphragm, iris diaphragm or grid diaphragm for producing the same accuracy in the control of the light beam.

The necessary size of the light-screening surface of the diaphragm plates may also be provided for if instead of the arrangement of openings 5, 5' in the plates 1, 1', the plate surface 1 is continuous but the plate itself is made smaller in area by 1/64 of the area of the diaphragm aperture 2, while the area of the plate surface of the plate 1' is so much larger than that of the plate 1 that when it is closed, it only leaves free 1/64 of that part of the diaphragm aperture which is not covered by the plate 1.

The first-mentioned arrangement with openings in the plate surfaces is however more favorable than the use of smaller plate surfaces without openings, since a diaphragm plate 1 with openings 5 exhibits a less steep control curve at small angles α of the openings; this is represented by the following equation:

$$L = 1 - \cos \alpha + \frac{\cos \alpha}{F} = 1 - \left(1 - \frac{1}{F}\right) \cos \alpha$$

wherein L represents the fraction of the incident light that is transmitted through the diaphragm, α the angle to the plane of the aperture and F the total area of the plate openings 5 in fractions of the diaphragm aperture 2. The additive element $$\frac{\cos \alpha}{F}$$

of the above equation expresses the influence of the aperture 5 to reduce the steepness of the control curve.

If it is desired that light should be completely obscured when the diaphragm is closed, it is necessary to omit the openings 5' in the plate 1' and to accept a lowering of the accuracy in the diaphragm adjustment at stages approximating to complete obscurity.

Instead of constructing plates 1 and 1' of material impermeable to light and including openings 5 and 5' in these light impermeable plates or making them smaller in area than the area of the aperture 2, these plates may be made of light-permeable material. In accordance with the aforementioned example, this material must have a transparency factor of 1/64. This construction allows diaphragm plates to be used which are no smaller in area than the area of the aperture.

It is also possible for more than two plates to be provided for each individual diaphragm and in this way an even greater accuracy in the diaphragm adjustment is obtained. Moreover, it is also possible for more than three individual diaphragms of the type described above to be combined to form a larger diaphragm.

Obviously many modifications and variations of the present invention are possible in the light of the above teachings. It is, therefore, to be understood that within the scope of the appended claims the invention may be practiced otherwise than as specifically described.

What I claim is:

1. A diaphragm for continuously regulating a photometer aperture comprising two light obstructing elements, supports for said elements disposed in fixed positions relative to said aperture, said elements being arranged on said supports in a manner permitting each of said elements to be moved from an opened to a closed position to open and close said aperture, said light obstructing elements overlapping in said closed position over substantially all of said aperture, a common control means continuously variable over a range of positions being operatively coupled to each of said elements, said common control means being constructed and arranged for individually moving a first one of said two elements through a continuous sequence of positions from said opened to said closed position and for then individually moving the second of said elements through a continuous sequence of positions from said opened to said closed position, in said closed position said two elements being arranged one over the other before said aperture, and in said closed position a fraction of the light passing through said aperture being unobscured by said first element.

2. A diaphragm as claimed in claim 1, in which the element which first reaches its closed position on closing the diaphragm has a light obstructing area less than the area of said aperture so as to leave a predetermined fraction of the aperture of the diaphragm unobscured and in which a following element has a light obstructing area especially less than the area of said aperture and is arranged to cooperate with said light obstructing area of said first closed element so that when in its closed position it obscures at least a fraction of the remainder of the aperture.

3. A diaphragm as claimed in claim 1, in which the elements are made of light-permeable material of a selected degree of permeability.

4. A diaphragm as claimed in claim 1 in which that plate which first reaches its closed position is smaller in area than the aperture.

5. A diaphragm as claimed in claim 1 in which the said element or plate has peripheral dimensions at least equal to the corresponding aperture dimensions, but is light-permeable over part of its area.

6. A diaphragm as claimed in claim 5 in which the second plate is also light-permeable over part of its area, light permeable portions of the two plates being positioned so as to be obscured to a predetermined extent when the two plates are overlapping in the closed position.

7. A diaphragm as claimed in claim 5 in which a light-permeable part of a plate is provided with a light-diffusing covering, preferably an opal glass disc.

8. A compound diaphragm comprising a plurality of individual diaphragms as claimed in claim 7 and in which corresponding elements of the individual diaphragms are jointly controlled by a member of the common control means.

9. A diaphragm as claimed in claim 1 in which each plate has a slot and two spring loaded slides are provided one for each of the two different types of plate, each slide having a number of pins equal to the number of its corresponding plates, a pin being adapted to engage each slot to open or close the diaphragm and each slide being governed by a corresponding cam, the two cams being mounted on a common rotatable spindle.

10. The invention as set forth in claim 1 wherein each of said elements is a plate, and said means mounting said plates permits movement of said plates through 90° into and out of a plane parallel to the plane of said aperture.

References Cited in the file of this patent

UNITED STATES PATENTS

| Number | Name | Date |
|---|---|---|
| 562,599 | Friese | June 23, 1896 |
| 709,837 | Wheeler | Sept. 23, 1902 |
| 1,176,120 | Wilson | Mar. 21, 1916 |
| 1,236,966 | Minetti et al. | Aug. 14, 1917 |
| 1,913,182 | Williamson | June 6, 1933 |
| 2,178,197 | Bing | Oct. 31, 1939 |
| 2,186,203 | Centeno | Jan. 9, 1940 |
| 2,247,763 | Meyers | July 1, 1941 |
| 2,247,805 | Faus | July 1, 1941 |
| 2,337,122 | Norwood | Dec. 21, 1943 |
| 2,359,187 | Aldis | Sept. 26, 1944 |
| 2,482,281 | Lingel | Sept. 20, 1949 |
| 2,700,802 | Agnew | Feb. 1, 1955 |
| 2,700,916 | Muirhead | Feb. 1, 1956 |

FOREIGN PATENTS

| Number | Country | Date |
|---|---|---|
| 67,726 | Austria | Jan. 25, 1915 |
| 463,921 | Great Britain | Apr. 8, 1937 |